US012652375B2

(12) United States Patent (10) Patent No.: US 12,652,375 B2
Miyaura et al. (45) Date of Patent: Jun. 9, 2026

(54) IMAGING APPARATUS, CONTROL METHOD OF IMAGING APPARATUS, AND NON-TRANSITORY COMPUTER READABLE MEDIUM

(71) Applicant: CANON KABUSHIKI KAISHA, Tokyo (JP)

(72) Inventors: Marina Miyaura, Kanagawa (JP); Takashi Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 18/670,156

(22) Filed: May 21, 2024

(65) Prior Publication Data

US 2024/0406366 A1 Dec. 5, 2024

(30) Foreign Application Priority Data

May 29, 2023 (JP) ................................. 2023-087581

(51) Int. Cl.
| | |
|---|---|
| *H04N 13/218* | (2018.01) |
| *H04N 13/232* | (2018.01) |
| *H04N 13/246* | (2018.01) |
| *H04N 13/296* | (2018.01) |

(52) U.S. Cl.
CPC ......... *H04N 13/218* (2018.05); *H04N 13/232* (2018.05); *H04N 13/246* (2018.05); *H04N 13/296* (2018.05)

(58) Field of Classification Search
None
See application file for complete search history.

(56) References Cited

U.S. PATENT DOCUMENTS

| | | | | |
|---|---|---|---|---|
| 2008/0204566 A1* | 8/2008 | Yamazaki | ............. | H04N 7/025 |
| | | | | 348/E5.022 |
| 2009/0080874 A1* | 3/2009 | Ikehata | ................. | H04N 23/63 |
| | | | | 396/50 |
| 2009/0096910 A1* | 4/2009 | Yasuda | ................. | G06F 3/0346 |
| | | | | 348/333.01 |
| 2011/0242394 A1* | 10/2011 | Ohdate | ................ | H04N 23/635 |
| | | | | 348/333.02 |
| 2013/0169761 A1* | 7/2013 | Inoue | .................... | G03B 17/14 |
| | | | | 348/49 |
| 2015/0161761 A1* | 6/2015 | Maeda | ................... | H04N 23/64 |
| | | | | 348/374 |

(Continued)

FOREIGN PATENT DOCUMENTS

JP       2002271654 A       9/2002

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

An imaging apparatus according to the present invention includes: a processor; and a memory storing a program which, when executed by the processor, causes the imaging apparatus to acquire information on an inclination of the imaging apparatus, acquire information on an inclination of a dual lens in a case where the dual lens is mounted to the imaging apparatus, perform first control so as to notify the inclination of the imaging apparatus based on the information on the inclination of the imaging apparatus, and perform second control so as to notify the inclination of the dual lens based on the information on the inclination of the dual lens.

14 Claims, 7 Drawing Sheets

(56) References Cited

U.S. PATENT DOCUMENTS

| | | | | |
|---|---|---|---|---|
| 2017/0054915 A1* | 2/2017 | Sato | ........................ | H04N 23/64 |
| 2017/0236298 A1* | 8/2017 | Vetter | .................... | G06V 40/10 |
| | | | | 348/77 |
| 2018/0234631 A1* | 8/2018 | Takagi | ................. | H04N 23/675 |
| 2020/0213529 A1* | 7/2020 | Kamata | ................... | H04N 23/72 |
| 2021/0075967 A1* | 3/2021 | Yukitake | .............. | H04N 23/683 |
| 2021/0088893 A1* | 3/2021 | Murakami, I | ........ | H04N 13/218 |
| 2023/0209177 A1* | 6/2023 | Inazawa | .............. | H04N 23/667 |
| | | | | 348/333.02 |
| 2024/0357067 A1* | 10/2024 | Sampei | ............... | H04N 13/218 |

* cited by examiner

FIG. 1

| LENS DESIGN VALUE |
| --- |
| LENS INDIVIDUAL VALUE |
| LENS FLAG |
| LENS FOCAL LENGTH |
| LENS TEMPERATURE |
| LENS MOUNT MAXIMUM RATTLE |
| INTRA-LENS ACCELEROMETER INFORMATION |

| CAMERA RECORDING AREA INFORMATION |
| --- |
| INTRA-CAMERA ACCELEROMETER INFORMATION |
| RIGHT EXPOSURE CORRECTION INFORMATION |

703
702
701

703
702
701

703
702
701

703
702
701

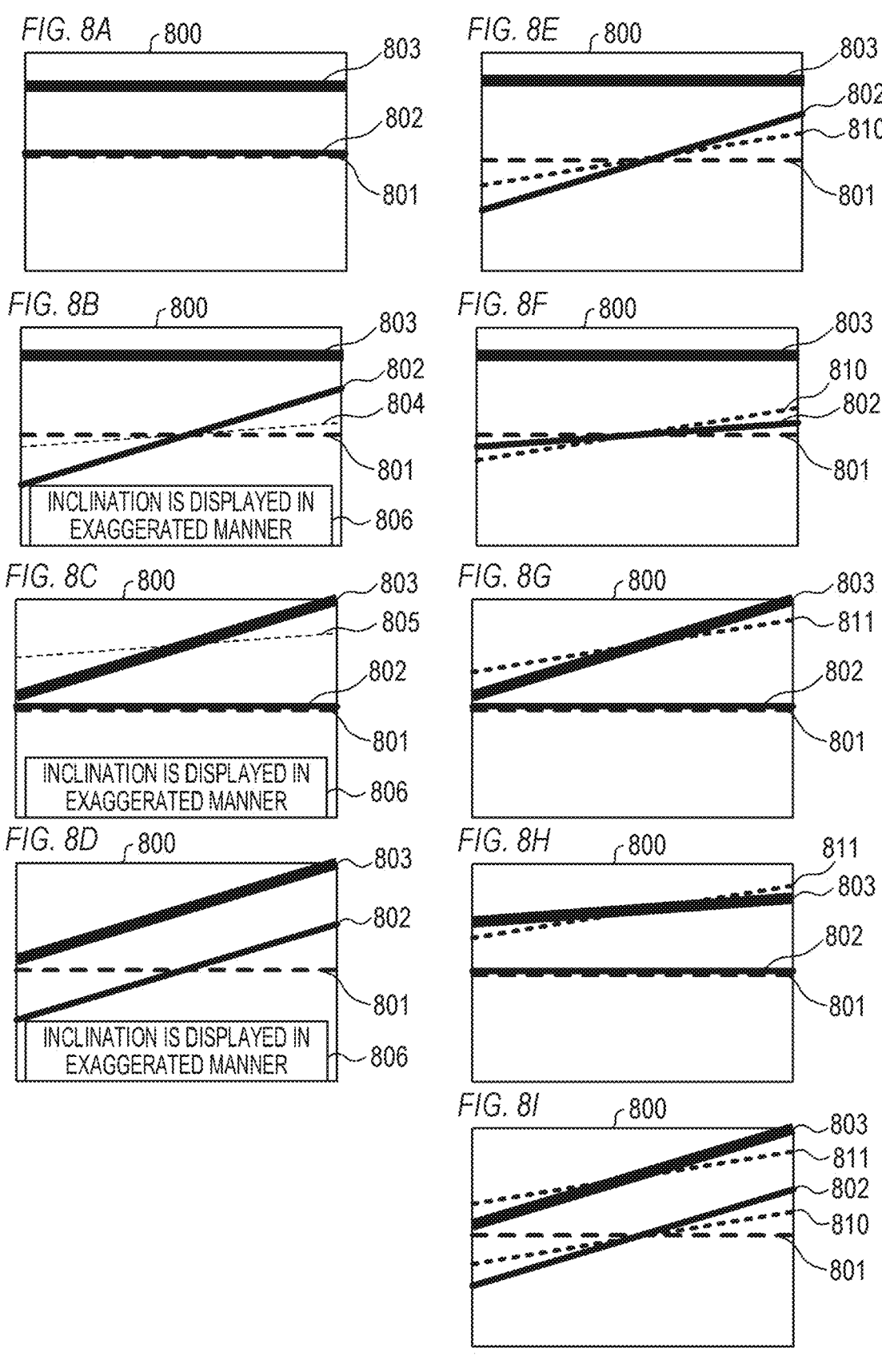

IMAGING APPARATUS, CONTROL METHOD OF IMAGING APPARATUS, AND NON-TRANSITORY COMPUTER READABLE MEDIUM

BACKGROUND OF THE INVENTION

Field of the Invention

The present invention relates to an imaging apparatus, a control method of an imaging apparatus, and a non-transitory computer readable medium.

Description of the Related Art

A digital camera having two optical systems is known. If the two optical systems are arranged so as to capture images in the same direction, two images with parallax can be obtained by using the two optical systems, and thus from the obtained two images, an image in a range of 180 degrees (image of a half celestial sphere) can be generated, or an image capable of stereoscopic vision can be generated. If the two optical systems are arranged so as to capture images in diametrically opposite directions, an image in a range of 360 degrees (omnidirectional image) can be generated from the two images acquired by using the two optical systems.

In a digital camera having two optical systems, unintended positional deviation of a subject in two images acquired by using the two optical systems may occur. For example, in a case where stereoscopic vision is performed, such positional deviation causes eye fatigue and a squint. The positional deviation can be reduced by image processing, but the load of the image processing increases as the positional deviation increases. Therefore, the positional deviation is preferably small. When the digital camera (two left and right optical systems) is horizontal, an image with a small positional deviation can be obtained as compared with a case where the digital camera is not horizontal.

JP 2002-271654 A discloses a technique for displaying a horizontal reference line indicating a horizontal direction of a camera and a horizontal shooting auxiliary line according to an inclination of the camera.

However, there is a case where the unintended positional deviation of the subject in the captured image cannot be sufficiently reduced only by horizontally placing the camera. In particular, in a case of obtaining an image capable of stereoscopic vision, a slight positional deviation is not allowed, and the positional deviation may not be sufficiently reduced only by horizontally placing the camera. In the camera in the related art, it is difficult to sufficiently reduce the positional deviation.

SUMMARY OF THE INVENTION

The present invention provides a technique of enabling easy and sufficient reducing of an unintended positional deviation of the subject in the captured image.

An imaging apparatus according to the present invention includes: a processor; and a memory storing a program which, when executed by the processor, causes the imaging apparatus to acquire information on an inclination of the imaging apparatus, acquire information on an inclination of a dual lens in a case where the dual lens is mounted to the imaging apparatus, perform first control so as to notify the inclination of the imaging apparatus based on the information on the inclination of the imaging apparatus, and perform second control so as to notify the inclination of the dual lens based on the information on the inclination of the dual lens.

Further features of the present invention will become apparent from the following description of exemplary embodiments with reference to the attached drawings.

BRIEF DESCRIPTION OF THE DRAWINGS

FIG. 1 is a schematic diagram illustrating an overall configuration of a system according to Embodiment 1;

FIGS. 8A to 8I are schematic diagrams illustrating a screen according to Embodiment 2.

DESCRIPTION OF THE EMBODIMENTS

In the following, embodiments of the present invention are described in detail with reference to the accompanying drawings.

Embodiment 1

In Embodiment 1, an example in which, in a case where a specific lens unit (specific lens) is mounted on a digital camera (imaging apparatus), the digital camera notifies a user of an inclination of the digital camera and an inclination of the lens unit is described. A case where the specific lens unit is a dual-lens unit (dual lens) for obtaining an image capable of stereoscopic vision is described, but the specific lens unit is not particularly limited. For example, the specific lens unit may be a dual-lens unit for obtaining an omnidirectional image, may be a compound eye lens unit (compound eye lens) having three or more optical systems, or may be an anamorphic lens unit (anamorphic lens).

Figure 1:
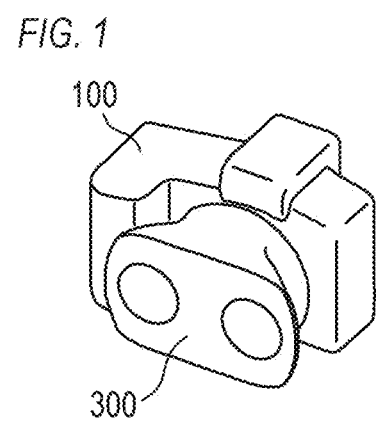

FIG. 1 is a schematic diagram illustrating an example of an entire configuration of a system according to Embodiment 1. The system according to Embodiment 1 includes a digital camera (camera) 100 and a lens unit mounted on the camera 100. In FIG. 1, a lens unit 300 is mounted (connected) to the camera 100. Details of the lens unit 300 are described below, and by mounting the lens unit 300, the camera 100 can capture one image including two image areas (still image or moving image) with a predetermined parallax.

Figure 2A:
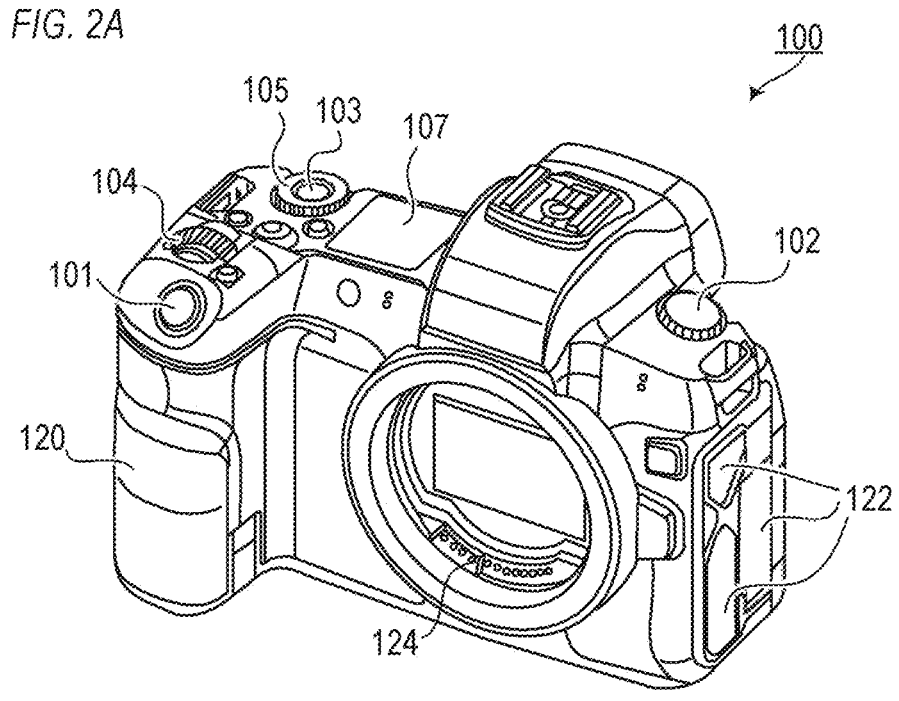
FIGS. 2A and 2B are external views of a camera according to Embodiment 1.
Figure 2B:
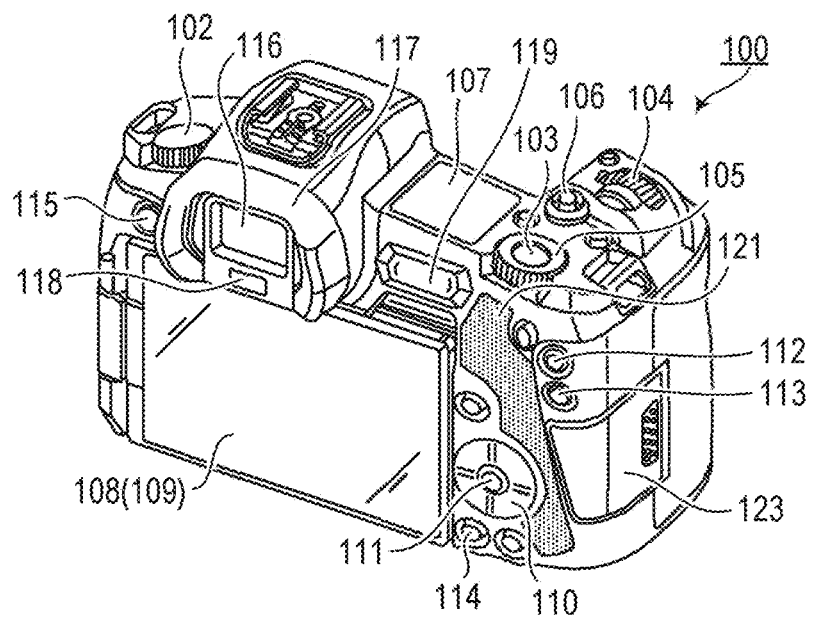

FIGS. 2A and 2B are external views illustrating an example of the appearance of the camera 100. FIG. 2A is a perspective view of the camera 100 viewed from the front side, and FIG. 2B is a perspective view of the camera 100 viewed from the back side.

The camera 100 includes, on the upper surface thereof, a shutter button 101, a power switch 102, a mode selector switch 103, a main electronic dial 104, a sub-electronic dial 105, a movie button 106, and an outside viewfinder display unit 107. The shutter button 101 is an operation member for providing a shooting preparation instruction or a shooting instruction. The power switch 102 is an operation member for switching on or off of the power supply of the camera 100. The mode selector switch 103 is an operation member for switching among various modes. The main electronic dial 104 is a rotary operation member for changing setting values such as a shutter speed and an aperture value. The sub-electronic dial 105 is a rotary operation member for moving a selection frame (cursor) and feeding images. The movie button 106 is an operation member for providing an instruction to start or stop moving image shooting (recording). The outside viewfinder display unit 107 displays various setting values such as a shutter speed and an aperture value.

The camera 100 includes, on the back surface, a display unit 108, a touch panel 109, a direction key 110, a SET button 111, an AE lock button 112, an enlargement button 113, a playback button 114, a menu button 115, an eyepiece portion 116, an eyepiece detection unit 118, and a touch bar 119. The display unit 108 displays images and various types of information. The touch panel 109 is an operation member for detecting a touch operation on the display surface (touch operation surface) of the display unit 108. The direction key 110 is an operation unit configured with keys that can be pressed up, down, left and right (four direction keys). Processing corresponding to the position where the direction key 110 is pressed can be performed. The SET button 111 is an operation member to be pressed mainly when a selected item is determined. The AE lock button 112 is an operation member to be pressed when an exposure state is fixed in a shooting standby state. The enlargement button 113 is an operation member for switching on or off an enlargement mode in live view display (LV display) of a shooting mode. In the case where the enlargement mode is switched on, a live view image (LV image) is enlarged or reduced by operating the main electronic dial 104. In addition, the enlargement button 113 is used for enlarging a playback image or increasing an enlargement ratio in a playback mode. The playback button 114 is an operation member for switching between the shooting mode and the playback mode. In case of the shooting mode, according to the press of the playback button 114, the mode shifts to the playback mode, so that it is possible to display the latest one of images recorded in a recording medium 227 described below on the display unit 108.

The menu button 115 is an operation member to be pressed for displaying a menu screen, which enables various settings, on the display unit 108. A user can intuitively perform the various settings by using the menu screen displayed on the display unit 108, the direction key 110, and the SET button 111. The eyepiece portion 116 is a portion in which the user approaches and looks through an eyepiece viewfinder (looking-through type viewfinder) 117 with the eyes. The user can visually confirm video displayed on an EVF 217 (electronic view finder) described below in the camera 100 through the eyepiece portion 116. The eyepiece detection unit 118 is a sensor for detecting whether the user approaches the eyepiece portion 116 (eyepiece viewfinder 117) with the eyes.

The touch bar 119 is a linear touch operation member (line touch sensor) capable of receiving a touch operation. The touch bar 119 is disposed at a position that allows a touch operation (allows a touch) with the thumb finger of the right hand in a state in which a grip portion 120 is gripped with the right hand (a state in which the grip portion 120 is gripped with the little finger, the ring finger, and the middle finger of the right hand) such that the shutter button 101 can be pressed by the index finger of the right hand. That is, the touch bar 119 can be operated in a state in which the user approaches to the eyepiece viewfinder 117 with the eyes, looks through the eyepiece portion 116, and holds the camera 100 so as to be able to press the shutter button 101 at any time (shooting orientation). The touch bar 119 can receive a tapping operation on the touch bar 119 (an operation of touching the touch bar and releasing the touch bar without moving the touch position within a predetermined period of time), a sliding operation to the left or right (operation of touching the touch bar and then moving the touch position while keeping the touch), and the like. The touch bar 119 is an operation member that is different from the touch panel 109 and does not have a display function. The touch bar 119 functions as, for example, a multi-function bar (M-Fn bar) where various functions can be allocated.

In addition, the camera 100 also has the grip portion 120, a thumb rest portion 121, a terminal cover 122, a lid 123, and a communication terminal 124. The grip portion 120 is a holding portion formed in a shape easy for the user to grip with the right hand when the user holds the camera 100. The shutter button 101 and the main electronic dial 104 are arranged at positions that allow the user to operate the shutter button 101 and the main electronic dial 104 with the index finger of the right hand in a state in which the user holds the camera 100 while gripping the grip portion 120 with the little finger, the ring finger, and the middle finger of the right hand. The sub-electronic dial 105 and the touch bar 119 are arranged at positions that allow the user to operate the sub-electronic dial 105 and the touch bar 119 with the thumb finger of the right hand in the same state. The thumb rest portion 121 (thumb standby position) is a grip portion provided at a place where it is easy for the user to place the thumb finger of the right hand that grips the grip portion 120 on the back side of the camera 100 in a state in which any of the operation members is not operated. The thumb rest portion 121 is configured with a rubber member for enhancing the holding power (gripping feeling). The terminal cover 122 protects connectors such as connection cables for connecting the camera 100 to external devices (external equipment). The lid 123 closes a slot for storing the recording medium 227 described below, to protect the recording medium 227 and the slot. The communication terminal 124 is a terminal for communicating with a lens unit (for example, a lens unit 200 or the lens unit 300 described below) attachable to and detachable from the camera 100.

Figure 3:
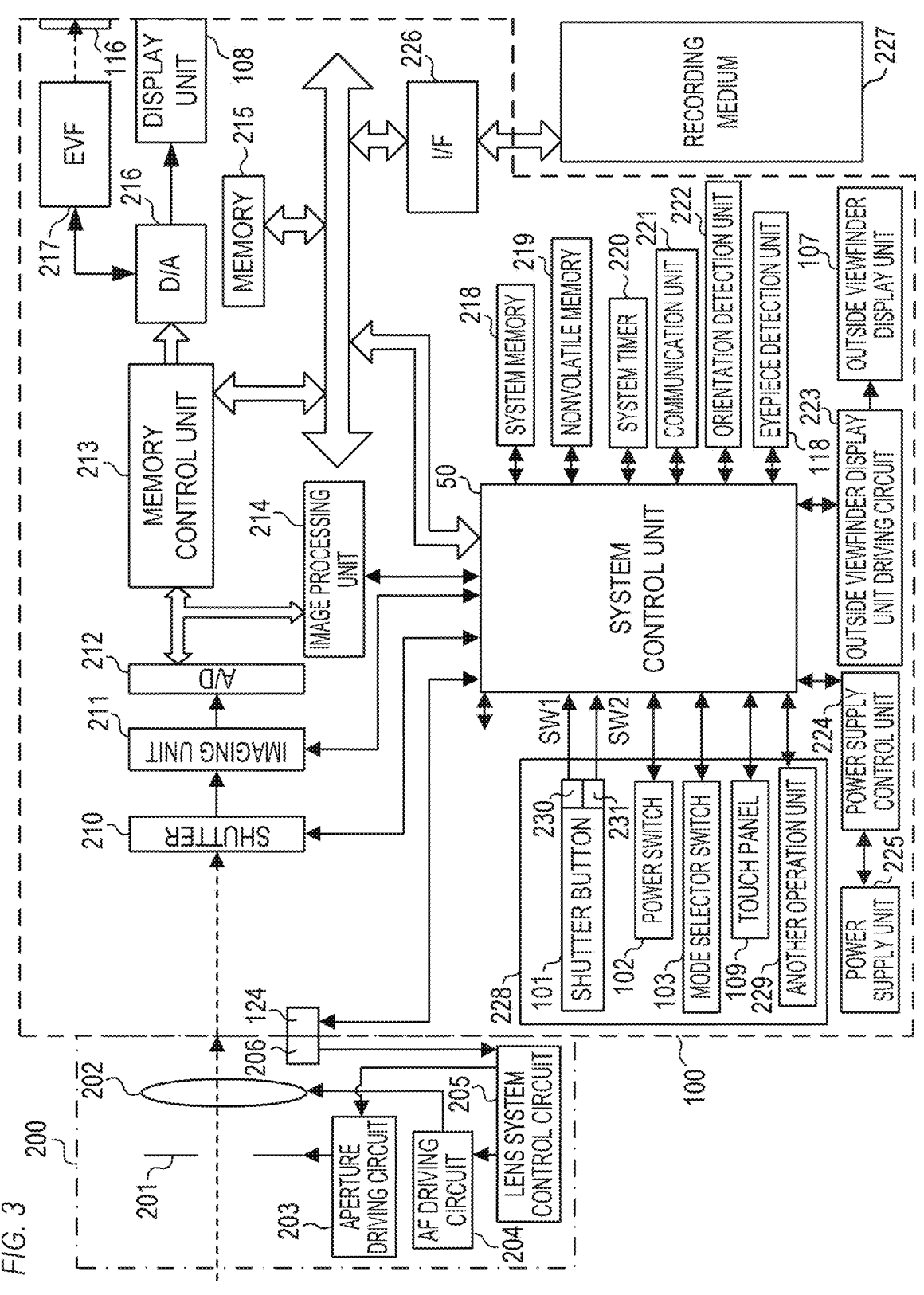
FIG. 3 is a block diagram illustrating a configuration of the camera according to Embodiment 1.

FIG. 3 is a block diagram illustrating an example of the configuration of the camera 100. In FIG. 3, the same components as those in FIGS. 2A and 2B are denoted by the same reference numerals as in FIGS. 2A and 2B, and description thereof is appropriately omitted. In FIG. 3, the lens unit 200 is mounted to the camera 100.

First, the lens unit 200 is described. The lens unit 200 is a type of an interchangeable lens unit (interchangeable lens) that is attachable to and detachable from the camera 100. The lens unit 200 is a single-lens unit (single lens) and is an example of a normal lens unit. The lens unit 200 includes an aperture 201, a lens 202, an aperture driving circuit 203, an auto focus (AF) driving circuit 204, a lens system control circuit 205, and a communication terminal 206, and the like.

The aperture 201 is configured with an adjustable aperture diameter. The lens 202 is configured with a plurality of lenses. The aperture driving circuit 203 adjusts a quantity of light by controlling the aperture diameter of the aperture 201. The AF driving circuit 204 adjusts the focus by driving the lens 202. The lens system control circuit 205 controls the aperture driving circuit 203, the AF driving circuit 204, and the like based on instructions from a system control unit 50 described below. The lens system control circuit 205 controls the aperture 201 via the aperture driving circuit 203 and adjusts the focus by changing the position of the lens 202 via the AF driving circuit 204. The lens system control circuit 205 can communicate with the camera 100. Specifically, the communication is performed via the communication terminal 206 of the lens unit 200 and the communication terminal 124 of the camera 100. The communication terminal 206 is a terminal that allows the lens unit 200 to communicate with the camera 100 side.

The camera 100 is described below. The camera 100 includes a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal plane shutter that can freely control the exposure time of the imaging unit 211 based on an instruction of the system control unit 50. The imaging unit 211 is an imaging element (image sensor) configured with a CCD, a CMOS element, or the like that convert an optical image into an electrical signal. The imaging unit 211 may include an imaging-area phase-difference sensor for outputting defocus-amount information to the system control unit 50. The A/D converter 212 converts an analog signal output from the imaging unit 211 into a digital signal. The image processing unit 214 performs predetermined processing (such as pixel interpolation, resizing processing such as reduction, and color conversion processing) on data from the A/D converter 212 or data from the memory control unit 213. Moreover, the image processing unit 214 performs predetermined arithmetic processing by using captured image data, and the system control unit 50 performs exposure control and distance measurement control based on the obtained result of calculation. Through-the-lens (TTL)-type AF processing, auto exposure (AE) processing, EF (flash pre-flash) processing, and the like are performed by this processing. Furthermore, the image processing unit 214 performs predetermined calculation processing by using the captured image data, and the system control unit 50 performs TTL-type auto white balance (AWB) processing based on the obtained result of calculation.

Image data from the A/D converter 212 is written into the memory 215 via the image processing unit 214 and the memory control unit 213. Alternatively, the image data from the A/D converter 212 is written into the memory 215 via the memory control unit 213 without the intervention of the image processing unit 214. The memory 215 stores image data that is obtained by the imaging unit 211 and is converted into digital data by the A/D converter 212 and image data to be displayed on the display unit 108 or the EVF 217. The memory 215 includes a storage capacity sufficient to store a predetermined number of still images and a predetermined length of moving images and voice. The memory 215 also serves as a memory for displaying an image (video memory).

The D/A converter 216 converts image data for display stored in the memory 215 into an analog signal and supplies the analog signal to the display unit 108 or the EVF 217. Accordingly, the image data for display written into the memory 215 is displayed on the display unit 108 or the EVF 217 via the D/A converter 216. The display unit 108 and the EVF 217 provide display in response to the analog signal from the D/A converter 216. The display unit 108 and the EVF 217 are, for example, LCD or organic EL displays. The digital signal that is A/D converted by the A/D converter 212 and is accumulated in the memory 215 is converted into the analog signal in the D/A converter 216, and the analog signal is sequentially transferred to and displayed on the display unit 108 or the EVF 217, so that live view display is performed.

The system control unit 50 is a control unit including at least one processor and/or at least one circuit. That is, the system control unit 50 may be a processor, may be a circuit, or may be a combination of a processor and a circuit. The system control unit 50 controls the entire camera 100. The system control unit 50 implements the processing of flowcharts described below, by running programs recorded in a nonvolatile memory 219. In addition, the system control unit 50 also performs display control by controlling the memory 215, the D/A converter 216, the display unit 108, the EVF 217, and the like.

The camera 100 also includes a system memory 218, the nonvolatile memory 219, a system timer 220, a communication unit 221, an orientation detection unit 222, and the eyepiece detection unit 118.

For example, a RAM is used as the system memory 218. In the system memory 218, constants, variables, and programs read from the nonvolatile memory 219 for the operation of the system control unit 50 are loaded. The nonvolatile memory 219 is an electrically erasable and recordable memory. For example, an EEPROM is used as the nonvolatile memory 219. In the nonvolatile memory 219, constants, programs, and the like for the operation of the system control unit 50 are recorded. The program as used herein includes programs for executing the flowcharts described below. The system timer 220 is a clocking unit that counts time used for various kinds of control and time of a built-in clock. The communication unit 221 transmits and receives a video signal and a voice signal to and from external equipment connected wirelessly or via a cable. The communication unit 221 is also connectable to a wireless local area network (LAN) and the Internet. Moreover, the communication unit 221 can communicate with external equipment also via Bluetooth (registered trademark) and Bluetooth Low Energy. The communication unit 221 can transmit an image captured by the imaging unit 211 (including a live image) and an image recorded in the recording medium 227 and can receive an image and other various types of information from external equipment. The orientation detection unit 222 is an orientation detection sensor that detects the orientation of the camera 100 with respect to the direction of gravity. Based on the orientation detected by the orientation detection unit 222, whether an image shot by the imaging unit 211 is an image shot with the camera 100 held in a horizontal position or held in a vertical position can be determined. The system control unit 50 can add orientation information in accordance with the orientation detected by the orientation detection unit 222 to an image file of the image shot by the imaging unit 211 and can rotate the image according to the detected orientation. For example, an acceleration sensor or a gyro sensor can be used for the orientation detection unit 222. The orientation detection unit 222 can also be used to detect the movement of the camera 100 (whether it is panning, tilting, lifting, stationary, or the like).

The eyepiece detection unit 118 can detect an object approaching the eyepiece portion 116 (eyepiece viewfinder 117). For example, an infrared proximity sensor can be used as the eyepiece detection unit 118. When an object approaches, infrared light emitted from a light-emitting portion of the eyepiece detection unit 118 is reflected on the object and is received by a light-receiving portion of the infrared proximity sensor. A distance from the eyepiece portion 116 to the object can be determined according to the amount of received infrared light. In this way, the eyepiece detection unit 118 performs eye approach detection for detecting a distance between the eyepiece portion 116 and the object approaching the eyepiece portion 116. The eyepiece detection unit 118 is an eye approach detection sensor that detects approach (eye approach) and separation (eye separation) of an eye (object) to and from the eyepiece portion 116. In a case where an object approaching the eyepiece portion 116 within a predetermined distance is detected in a non-eye approach state (non-approach state), the eyepiece detection unit 118 detects that an eye approaches. Meanwhile, in a case where the object of which the approach is detected is separated by a predetermined distance or longer in an eye approach state (approach state), the eyepiece detection unit 118 detects that an eye is separated. A threshold value for detecting the eye approach and a threshold value for detecting the eye separation may be different for providing, for example, a hysteresis. In addition, after the eye approach is detected, the eye approach state is assumed until the eye separation is detected. After the eye separation is detected, the non-eye approach state is assumed until the eye approach is detected. The system control unit 50 switches between display (display state) and non-display (non-display state) of each of the display unit 108 and the EVF 217 according to the state detected by the eyepiece detection unit 118. Specifically, in a case where at least the shooting standby state is established, and a switching setting for a display destination is set to automatic switching, the display destination is set as the display unit 108, and the display is turned on, while the EVF 217 is set to non-display during the non-eye approach state. Also, during the eye approach state, the EVF 217 is set as the display destination, and the display is turned on, while the display unit 108 is set to non-display. Note that the eyepiece detection unit 118 is not limited to the infrared proximity sensor, and other sensors may be used as the eyepiece detection unit 118 as long as the sensors can detect the state which can be regarded as the eye approach.

The camera 100 also has the outside viewfinder display unit 107, an outside viewfinder display unit driving circuit 223, a power supply control unit 224, a power supply unit 225, a recording medium I/F 226, and an operation unit 228.

The outside viewfinder display unit 107 is driven by the outside viewfinder display unit driving circuit 223 and displays various setting values for the camera 100 such as a shutter speed and an aperture value. The power supply control unit 224 is configured with a battery detection circuit, a DC-DC converter, a switch circuit that switches the block to be energized, and the like and detects whether a battery is mounted, the type of battery, the remaining battery level, and the like. Moreover, the power supply control unit 224 controls the DC-DC converter based on the detection result and an instruction from the system control unit 50 and supplies a required voltage to portions including the recording medium 227 for a necessary period. The power supply unit 225 is a primary battery such as alkaline and lithium batteries, a secondary battery such as NiCd, NiMH, and Li batteries, an AC adapter, or the like. The recording medium I/F 226 is an interface to the recording medium 227 such as a memory card and a hard disk. The recording medium 227 is a memory card for recording shot images, and the like and is configured with a semiconductor memory, a magnetic disk, and the like. The recording medium 227 may be attachable to and detachable from the camera 100 or may also be embedded in the camera 100.

The operation unit 228 is an input unit that receives an operation from the user (user operation) and is used for inputting various instructions to the system control unit 50. The operation unit 228 includes the shutter button 101, the power switch 102, the mode selector switch 103, the touch panel 109, another operation unit 229, and the like. The another operation unit 229 include the main electronic dial 104, the sub-electronic dial 105, the movie button 106, the direction key 110, the SET button 111, the AE lock button 112, the enlargement button 113, the playback button 114, the menu button 115, the touch bar 119, and the like.

The shutter button 101 includes a first shutter switch 230 and a second shutter switch 231. The first shutter switch 230 is turned on in the middle of the operation of the shutter button 101 in response to so-called half-press (shooting preparation instruction) and outputs a first shutter switch signal SW1. The system control unit 50 starts shooting preparation processing such as AF processing, AE processing, AWB processing, and EF processing in response to the first shutter switch signal SW1. The second shutter switch 231 is turned on at the completion of the operation of the shutter button 101 in response to so-called full-press (shooting instruction) and outputs a second shutter switch signal SW2. In response to the second shutter switch signal SW2, the system control unit 50 starts a sequence of shooting processing involving reading of a signal from the imaging unit 211, generating an image file including the shot image, and writing of the generated image file into the recording medium 227.

The mode selector switch 103 switches the operation mode of the system control unit 50 to any one of a still image shooting mode, a moving image shooting mode, and a playback mode. The still image shooting mode includes modes such as an auto shooting mode, an auto scene-determination mode, a manual mode, an aperture-priority mode (Av mode), a shutter-speed priority mode (Tv mode), and a program AE mode (P mode). The mode also includes various scene modes which have shooting settings for different shooting scenes, a custom mode, and the like. The user can directly switch the mode to any of the above-described shooting modes with the mode selector switch 103. Alternatively, the user can temporarily switch a screen to a list screen of the shooting modes with the mode selector switch 103 and then selectively switch the mode to any of the plurality of displayed modes with the operation unit 228. Likewise, the moving image shooting mode may include a plurality of modes.

The touch panel 109 is a touch sensor for detecting various touch operations on the display surface of the display unit 108 (the operation surface of the touch panel 109). The touch panel 109 and the display unit 108 can be integrally configure a single unit. For example, the touch panel 109 is attached to an upper layer of the display surface of the display unit 108 such that the transmittance of light does not hinder the display on the display unit 108. Furthermore, input coordinates on the touch panel 109 and display coordinates on the display surface of the display unit 108 are associated with each other, thereby configuring a graphical user interface (GUI) with which the user can directly operate a screen displayed on the display unit 108. The touch panel 109 can use any of various methods including resistive film, capacitive, surface acoustic wave, infrared, electromagnetic induction, image recognition, optical sensor methods, and the like. Depending on the methods, there are a method of detecting a touch based on contact with the touch panel 109 and a method of detecting a touch based on approach of a finger or a pen to the touch panel 109, but any method may be adopted.

For the touch panel 109, the system control unit 50 can detect the following operations or states:

An operation in which a finger or a pen that is not in contact with the touch panel 109 newly touches the touch panel 109, that is, a start of a touch (hereinafter referred to as touch-down).

A state in which the finger or the pen is in contact with the touch panel 109 (hereinafter referred to as touch-on).

An operation in which the finger or the pen is moving while being in contact with the touch panel 109 (hereinafter referred to as touch-move).

An operation in which the finger or the pen that is in contact with the touch panel 109 is separated from (released from) the touch panel 109, that is, an end of the touch (hereinafter referred to as touch-up).

A state in which nothing is in contact with the touch panel 109 (hereinafter referred to as touch-off).

When the touch-down is detected, the touch-on is detected at the same time. After the touch-down, the touch-on is continuously detected unless the touch-up is detected. Also, when the touch-move is detected, the touch-on is continuously detected. Even if the touch-on is detected, the touch-move is not detected as long as the touch position is not moved. After the touch-up of all the fingers and the pen that have been in contact with the touch panel 109 is detected, the touch-off is established.

These operations and states and the position coordinates of the finger or the pen that is in contact with the touch panel 109 are notified to the system control unit 50 through an internal bus. The system control unit 50 determines what kind of operation (touch operation) has been performed on the touch panel 109, based on the notified information. With regard to the touch-move, a movement direction of the finger or the pen moving on the touch panel 109 can be determined for each vertical component and for each horizontal component on the touch panel 109, based on change of the position coordinates. When the touch-move for a predetermined distance or longer is detected, it is determined that a slide operation is performed. An operation in which a finger is swiftly moved by a certain distance while being in contact with the touch panel 109 and is separated is referred to as a flick. In other words, the flick is an operation in which the finger is swiftly slid on the touch panel 109 so as to flick the touch panel 109. When the touch-move for a predetermined distance or longer at a predetermined speed or higher is detected, and then the touch-up is detected without change, it is determined that the flick is performed (it can be determined that the flick is performed subsequently to the slide operation). Furthermore, a touch operation in which a plurality of places (for example, two points) is both touched (multi-touched) and the touch positions are brought close to each other is referred to as a pinch-in, and a touch operation in which the touch positions are moved away from each other is referred to as a pinch-out. The pinch-out and the pinch-in are collectively referred to as a pinching operation (or simply referred to as a pinch).

Figures 4, 5A, 5B:
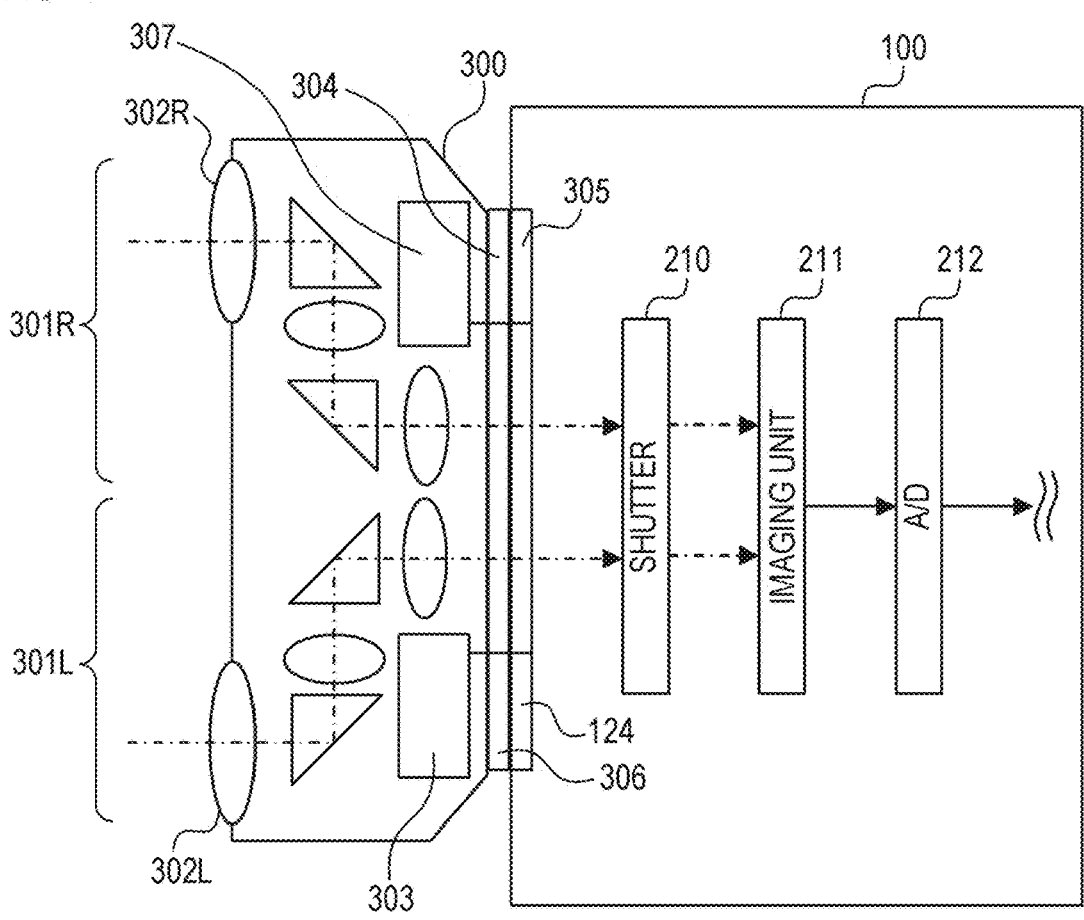
FIG. 4 is a schematic diagram illustrating a configuration of a lens unit according to Embodiment 1.
FIG. 5A is a schematic diagram illustrating lens information according to Embodiment 1.
FIG. 5B is a schematic diagram illustrating camera information according to Embodiment 1.

FIG. 4 is a schematic diagram illustrating an example of the configuration of the lens unit 300. FIG. 4 illustrates a state in which the lens unit 300 is mounted to the camera 100. In FIG. 4, the same components as those described in FIG. 3 are denoted by the same reference numerals as in FIG. 3, and the description thereof is appropriately omitted.

The lens unit 300 is a type of an interchangeable-lens unit attachable to and detachable from the camera 100. The lens unit 300 is a dual-lens unit capable of capturing a right image and a left image having a parallax. The lens unit 300 includes two optical systems, and each of the two optical systems can capture an image in a range at a wide viewing angle of about 180 degrees. Specifically, each of the two optical systems of the lens unit 300 can capture an image of a subject corresponding to a field of view (angle of view) of 180 degrees in the left-to-right direction (horizontal angle, azimuth angle, yaw angle) and 180 degrees in the up-and-down direction (vertical angle, elevation angle, pitch angle). That is, each of the two optical systems can capture an image in a front hemispherical range.

The lens unit 300 includes a right-eye optical system 301R including a plurality of lenses, reflecting mirrors, and the like, a left-eye optical system 301L including a plurality of lenses, reflecting mirrors, and the like, and a lens system control circuit 303. The right-eye optical system 301R includes a lens 302R disposed near the subject, and the left-eye optical system 301L includes a lens 302L disposed near the subject. The lens 302R and the lens 302L are oriented in the same direction and the optical axes thereof are substantially parallel to each other.

The lens unit 300 is a dual-lens unit (VR180 lens unit) for obtaining a VR180 image which is one of virtual reality (VR) image formats capable of dual stereoscopic vision. In the lens unit 300, each of the right-eye optical system 301R and the left-eye optical system 301L includes a circular fish-eye lens capable of capturing a range of about 180 degrees. Note that the range that can be captured by the lens of each of the right-eye optical system 301R and the left-eye optical system 301L may be a range of about 160 degrees narrower than the range of 180 degrees. The lens unit 300 can form the right image formed through the right-eye optical system 301R and the left image formed through the left-eye optical system 301L on one or two imaging elements of the camera to which the lens unit 300 is mounted. In the camera 100, the right image and the left image are formed on one imaging element (image sensor), and one image (dual image) in which a right image area (area of right image) and a left image area (area of left image) are arranged side by side is generated.

The lens unit 300 is mounted to the camera 100 via a lens mount portion 304 and a camera mount portion 305 of the camera 100. In this manner, the system control unit 50 of the camera 100 and the lens system control circuit 303 of the lens unit 300 are thus electrically connected to each other via the communication terminal 124 of the camera 100 and the communication terminal 306 of the lens unit 300.

An orientation detection unit 307 is an orientation detection sensor that detects the orientation of the lens unit 300 with respect to the direction of gravity. For example, an acceleration sensor, a gyro sensor, or the like can be used for the orientation detection unit 307. The orientation detection unit 307 can also be used to detect the movement of the lens unit 300 (whether it is panning, tilting, lifting, stationary, or the like).

In FIG. 4, the right image formed through the right-eye optical system 301R and the left image formed through the left-eye optical system 301L are formed side by side in the imaging unit 211 of the camera 100. In other words, the right-eye optical system 301R and the left-eye optical system 301L form two optical images (subject images) in the two areas of one imaging element (image sensor). The imaging unit 211 converts the formed optical image (optical signal) into an analog electric signal. By using the lens unit 300 in this manner, one image including two image areas having a parallax can be acquired from two places (optical systems), that is, the right-eye optical system 301R and the left-eye optical system 301L. By dividing the acquired image into an image for the left eye and an image for the right eye and providing the images in VR display, the user can view a stereoscopic VR image about in a 180-degree range. In other words, the user can view a VR180 image stereoscopically.

In this case, the VR image is an image that can be viewed in VR display described below. Examples of the VR image include an omnidirectional image (whole-celestial spherical image) captured by an omnidirectional camera (whole-celestial sphere camera) and a panoramic image having a video range (effective video range) larger than a display range that can be displayed at a time on the display unit. Examples of the VR image also include a moving image and a live image (an image acquired substantially in real time from a camera) as well as a still image. The VR image has a maximum video range (effective video range) corresponding to a field of view of 360 degrees in the left-to-right direction and 360 degrees in the up-and-down direction. Examples of the VR image also include images having an angle of view larger than an angle of view that can be captured by a typical camera or a video range larger than a display range that can be displayed at a time on the display unit, even when the angle of view or video range is smaller than 360 degrees in the left-to-right direction and 360 degrees in the up-and-down direction. An image captured by the camera 100 with the lens unit 300 described above is a type of the VR image. The VR image can be viewed in VR display by setting, for example, the display mode of a display device (a display device capable of displaying a VR image) at "VR view". A certain range of a VR image with a 360-degree angle of view is displayed so that the user can view a seamless omnidirectional video in the left-to-right direction by changing the orientation of the display device in the left-to-right direction (horizontal rotation direction) to move the displayed range.

The VR display (VR view) is a display method (display mode) for displaying, from among VR images, video in a field-of-view range in accordance with the orientation of the display device, the display method being capable of changing a display range. Examples of the VR display include "single-lens VR display (single-lens VR view)" in which an image is displayed after deformation (distortion correction) for mapping a VR image on a virtual sphere. Examples of the VR display includes "dual-lens VR display (dual-lens VR view)" in which a left-eye VR image and a right-eye VR image are displayed in left and right areas side by side after deformation for mapping the VR images on a virtual sphere. The "dual-lens VR display" is performed by using the left-eye VR image and the right-eye VR image having a parallax, thereby achieving a stereoscopic vision of the VR images. In any type of VR display, for example, when the user wears a display device such as a head mounted display (HMD), video in the field-of-view range corresponding to the orientation of the user's face is displayed. For example, it is assumed that from among the VR images, video is displayed in a field-of-view range having the center thereof at 0 degrees in the left-to-right direction (a specific cardinal point, for example, the north) and 90 degrees in the up-and-down direction (90 degrees from the zenith, that is, the horizon) at a certain point in time. In this state, if the orientation of the display device is flipped (for example, the display surface is changed from a southern direction to a northern direction), from among the same VR images, the display range is changed to video in a field-of-view range having the center thereof at 180 degrees in the left-to-right direction (an opposite cardinal point, for example, the south) and 90 degrees in the up-and-down direction. In other words, when the user in a state of mounting the HMD faces the south from the north (that is, looks back), video displayed on the HMD is changed from a video to the north to a video to the south. The VR image captured by using the lens unit 300 is an image (180-degree image) obtained by capturing the range of about 180 degrees in the front, and there is no video in the range of about 180 degrees in the rear. In the VR display of such an image, when the orientation of the display device is changed to a side where video does not exist, a blank area is displayed.

Such VR display of a VR image makes the user visually feel like staying in the VR image (in the VR space) (sense of immersion). Note that the VR image display method is not limited to a method for changing the orientation of the display device. For example, the display range may be moved (scrolled) in response to a user operation via a touch panel, directional buttons, or the like. In addition to the change of the display range by changing the orientation during the VR display (in the "VR View" display mode), the display range may be changed in response to the touch-move on the touch panel, a dragging operation with a mouse device or the like, or pressing the directional buttons. A smartphone mounted to VR goggles (head-mounted adapter) is a type of the HMD.

FIG. 5A is a schematic diagram illustrating an example of lens information to be acquired from the dual-lens unit. The lens information includes 1. Lens design value,
2. Lens individual value,
3. Lens flag,
4. Lens focal length,
5. Lens temperature,
6. Lens mount maximum rattle, and
7. Intra-lens accelerometer information.

The lens design value is a design value for correcting an aberration. Errors such as lens eccentricity and an inclination occur in each of the two optical systems (the left-eye optical system 301L and the right-eye optical system 301R) in the manufacturing of the dual-lens unit. If the left-right exchange (exchange of left image area and the right image area), the equirectangular conversion, or the like is performed without consideration of an error, the quality of dual-lens VR display is reduced, leading to difficulty in obtaining a satisfactory stereoscopic vision. The lens individual values are measurement results of errors detected in the manufacturing of the dual-lens unit (manufacturing errors).

The lens flag is a flag indicating that the lens is a dual-lens unit and can be used to determine whether a dual-lens unit is used. The lens focal length is a distance from a "principal point", which is the center of the lens, to the imaging element (image-forming position). The lens focal length may be or may not be a common parameter for the two optical systems of the dual-lens unit (the left-eye optical system 301L and the right-eye optical system 301R). In order to provide high-quality dual-lens VR display by highly accurately performing left-right exchange or performing the equirectangular conversion, a detailed (highly accurate) lens focal length is required. The lens temperature is the temperature of the dual-lens unit and is used to grasp the ambient temperature or the like at the time of shooting.

The lens mount maximum rattle is a design value of play generated in the mount portion (connection portion) of the dual-lens unit and the camera. The maximum inclination of the dual-lens unit with respect to the image sensor is determined by the play generated in the mount portion of the dual-lens unit and the camera. Note that the lens mount maximum rattle may be included in the camera information described below. The lens mount maximum rattle may be included only in one of the lens information and the camera information or may be included in both the lens information and the camera information.

The intra-lens accelerometer information is orientation information obtained by using an acceleration sensor (level) in the dual-lens unit and indicates the orientation of the lens in the rolling direction, the pitch direction, or the like.

FIG. 5B is a schematic diagram illustrating an example of the camera information generated in the camera. For example, the camera information is used for providing high-quality VR display. The camera information includes:

1. Camera recording area information,
2. Intra-camera accelerometer information,
3. Right exposure correction information, and the like.

The camera recording area information is information on effective image areas. The effective image area that can be displayed varies depending on the sensor of the camera and the recording mode. The intra-camera accelerometer information is orientation information obtained by using an intra-camera acceleration sensor (level) and indicates the orientation of the camera in the rolling direction or the pitch direction. The right exposure correction information is an exposure set value for bringing the exposure of the right image area close to the exposure of the left image area.

Figure 6:
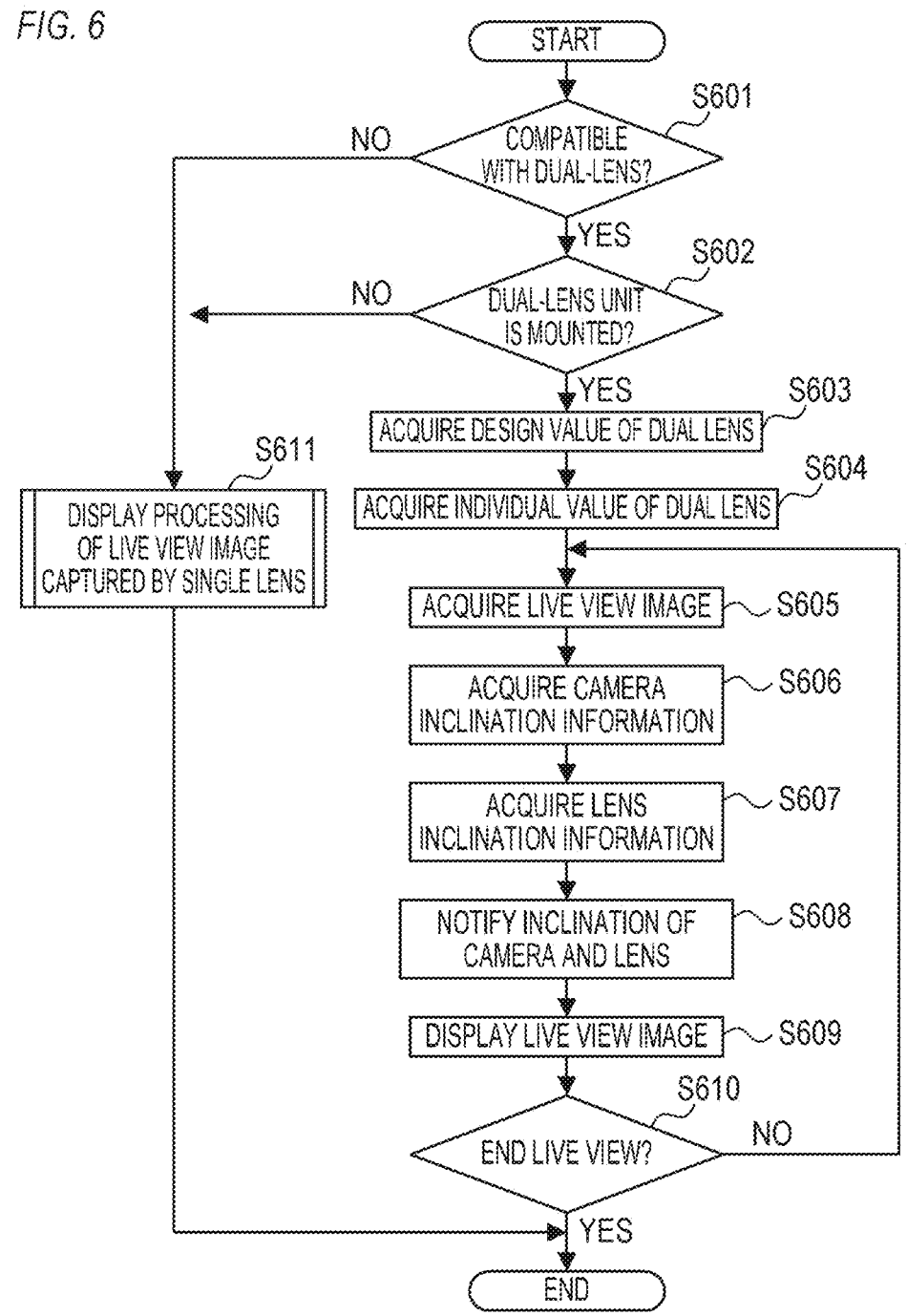
FIG. 6 is a flowchart illustrating operations of the camera according to Embodiment 1.

FIG. 6 is a flowchart showing an example of operations of the camera 100. These operations are implemented by loading a program recorded in the nonvolatile memory 219 into the system memory 218 and executing the program by the system control unit 50. For example, when the camera 100 is started, the operations of FIG. 6 are started. The operation of FIG. 6 is an operation of displaying a live view image (an image representing a subject in substantially real time) captured by the imaging unit 211 on the EVF 217 or the display unit 108. The operations of FIG. 6 are performed when the camera 100 is in a shooting standby state (shooting mode).

In step S601, the system control unit 50 determines whether the camera 100 is compatible with a dual-lens unit (for example, the lens unit 300). For example, the system control unit 50 determines whether the version of the firmware of the system control unit 50 is compatible with the dual-lens unit. If it is determined that the version is compatible with the dual-lens unit, the processing proceeds to step S602, but otherwise the processing proceeds to step S611. According to Embodiment 1, in the case of a dual-lens unit, unlike the case of a normal single-lens unit, it is required to acquire and record information on the dual-lens unit (lens information; information on the two optical systems of the dual-lens unit) for post processing. Therefore, the processing in step S601 is required.

In step S602, the system control unit 50 determines whether the dual-lens unit is mounted to the camera 100. If it is determined that the dual-lens unit is mounted, the processing proceeds to step S603, but otherwise the processing proceeds to step S611. If the dual-lens unit is newly mounted from a state in which the dual-lens unit is not mounted, the processing also proceeds to step S603. If the dual-lens unit is removed from the state in which the dual-lens unit is mounted, and then the single-lens unit is mounted, the processing proceeds to step S611.

In step S603, the system control unit 50 acquires, from the mounted (connected) dual-lens unit, the design values of the dual-lens unit. The design value is a parameter in design and is used for left-right exchange or the equirectangular conversion.

In step S604, the system control unit 50 acquires, from the mounted (connected) dual-lens unit, individual values of the dual-lens unit. The individual value is a parameter specific for a lens unit, for example, an error during manufacturing (manufacturing error). By using the individual value, image processing can be performed with higher accuracy than that in a case of only using a design value.

In step S605, the system control unit 50 acquires a live view image including the right image area and the left image area from the imaging unit 211.

In step S606, the system control unit 50 acquires information on the inclination of the camera 100 (camera inclination information) from the orientation detection unit 222 of the camera 100. For example, the system control unit 50 acquires an angle of inclination (inclination angle) of the camera 100 with respect to the ground (horizontal plane, plane perpendicular to vertical direction (gravity direction)) as the camera inclination information. Note that a method of acquiring the camera inclination information is not particularly limited. For example, a horizon may be detected from the live view image, and an angle of inclination in a horizontal direction (left-to-right direction) of the live view image with respect to a direction parallel to the detected horizon may be acquired as the camera inclination information. The reference plane of the inclination of the camera 100 is not limited to the ground.

In step S607, the system control unit 50 acquires inclination information (lens inclination information) of the dual-lens unit from the mounted (connected) dual-lens unit (for example, the orientation detection unit 307 of the lens unit 300). For example, the system control unit 50 acquires an angle of inclination (inclination angle) of the dual-lens unit with respect to the ground as the lens inclination information. Note that a method of acquiring the lens inclination information is not particularly limited. For example, a straight line passing through the center of the right image area (image circle) and the center of the left image area (image circle) may be detected by detecting the horizon, the right image area, and the left image area from the live view image. Then, an angle of inclination in a direction parallel to the detected straight line with respect to a direction parallel to the detected horizon may be acquired as the lens inclination information. The reference plane of the inclination of the dual-lens unit is not limited to the ground.

In step S608, the system control unit 50 notifies the user of the inclination of the camera 100 based on the camera inclination information acquired in step S606 and notifies the user of the inclination of the dual-lens unit based on the lens inclination information acquired in step S607. In Embodiment 1, the system control unit 50 notifies such an inclination by display on the EVF 217 or the display unit 108. Note that a method of notifying the inclination is not particularly limited, and notification may be performed, for example, by voice output.

In step S609, the system control unit 50 displays the live view image acquired in step S605 on the EVF 217 or the display unit 108.

In step S610, the system control unit 50 determines whether to end the live view display. For example, in a case where the user instructs the camera 100 to end the live view display or change the mode to a mode other than the shooting mode, the system control unit determines to end the live view display. In a case where the system control unit determines to end the live view display, the operation of FIG. 6 is ended, and otherwise, the processing proceeds to step S605.

When a single-lens unit is mounted to the camera 100, the processing in step S611 is performed. In step S611, the system control unit 50 displays the live view image captured by the single-lens unit on the EVF 217 or the display unit 108. The processing of step S611 is identical to processing in the related art of displaying a live view image captured by the single-lens unit, and thus detailed description thereof is omitted. When the processing of step S611 ends, the operation of FIG. 6 ends.

FIGS. 7A to 7D illustrate examples of screens displayed on the EVF 217 or the display unit 108 after the processing in step S618 in FIG. 6. Straight lines 701 to 703 are displayed on a screen 700 in FIGS. 7A to 7D. The straight line 701 is an item (reference line) parallel to the horizontal direction of the live view image (the horizontal direction of the image sensor and the left-to-right direction of the camera 100). The straight line 702 is an item indicating the inclination (direction and magnitude of inclination) of the camera 100 with respect to the ground. The straight line 703 is an item indicating the inclination (direction and magnitude of the inclination) of the dual-lens unit with respect to the ground. The system control unit 50 controls the inclination of the straight line 702 based on the camera inclination information and controls the inclination of the straight line 703 based on the lens inclination information. For example, the system control unit 50 controls the inclination of the straight line 702 such that the angle between the straight line 701 and the straight line 702 coincides with the angle of the inclination of the camera 100 with respect to the ground. Also, the system control unit 50 controls the inclination of the straight line 703 such that the angle between the straight line 701 and the straight line 703 coincides with the angle of the inclination of the dual-lens unit with respect to the ground.

Figures 7A, 7B, 7C, 7D:
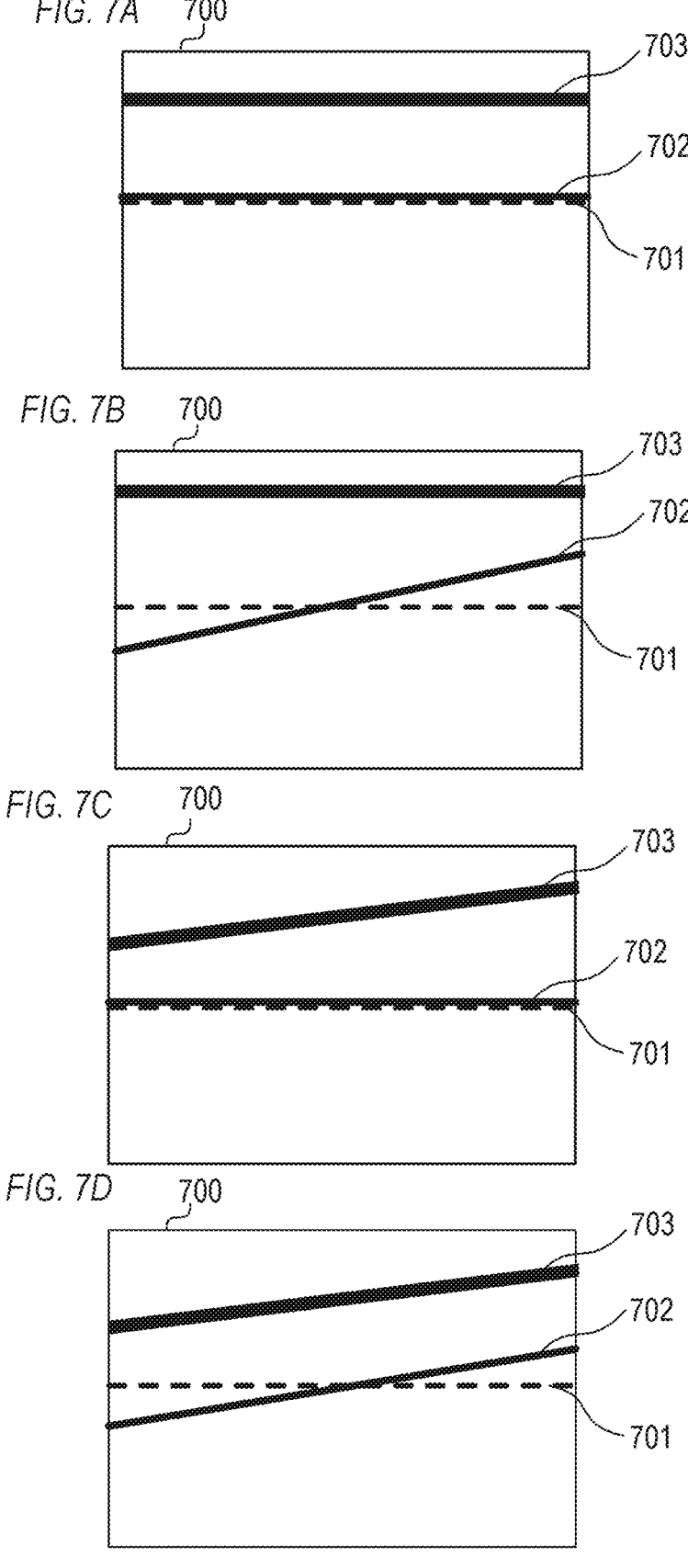
FIGS. 7A to 7D are schematic diagrams illustrating a screen according to Embodiment 1.

FIG. 7A illustrates an ideal state in which neither the camera 100 nor the dual-lens unit is inclined, with respect to the ground. The straight lines 702 and 703 are parallel to the straight line 701. By viewing these straight lines 702 and 703, the user can easily grasp that neither the camera 100 nor the dual-lens unit is inclined, with respect to the ground.

FIG. 7B illustrates a state in which the dual-lens unit is not inclined, but the camera 100 is inclined, with respect to the ground. The straight line 703 is parallel to the straight line 701, but the straight line 702 is inclined. By viewing these straight lines 702 and 703, the user can easily grasp that the dual-lens unit is not inclined but the camera 100 is inclined, with respect to the ground.

FIG. 7C illustrates a state in which the camera 100 is not inclined with respect to the ground but the dual-lens unit is inclined. The straight line 702 is parallel to the straight line 701, but the straight line 703 is inclined. By viewing these straight lines 702 and 703, the user can easily grasp that the camera 100 is not inclined but the dual-lens unit is inclined, with respect to the ground.

FIG. 7D illustrates a state in which both the camera 100 and the dual-lens unit are inclined with respect to the ground. Both the straight line 702 and the straight line 703 are inclined with respect to straight line 701. By viewing these straight lines 702 and 703, the user can easily grasp that both the camera 100 and the dual-lens unit are inclined, with respect to the ground.

Note that the straight line 701 may not be displayed. Even if the straight line 701 is not displayed, the user can grasp the horizontal direction of the live view image (the horizontal direction of the image sensor and the left-to-right direction of the camera 100) and grasp the inclination of the straight lines 702 and 703. Furthermore, the item indicating the inclination (direction and magnitude of inclination) is not limited to the straight lines 702 and 703. For example, a bar indicating inclination (direction and magnitude of inclination), an arrow indicating a direction in which the inclination is eliminated, or an arrow indicating a direction of the inclination may be displayed as the item indicating the inclination. The size or length of the arrow may change depending on the magnitude of the inclination.

Not only the inclination of the camera but also the inclination of the lens unit causes an unintended positional deviation of the subject in the captured image. According to Embodiment 1, not only the inclination of the camera but also the inclination of the lens unit is notified to the user. This allows the user to easily grasp and adjust the inclination of the camera and the inclination of the lens unit. As a result, the user can easily and sufficiently reduce an unintended positional deviation of the subject in the captured image.

Embodiment 2

In Embodiment 1, an example of notifying the user of the inclination of the camera and the lens unit is described. However, in a case where the inclination of a target object (the camera or the lens unit) is minute, even if the inclination is notified without change, the user cannot easily grasp whether the target object is inclined. Therefore, in Embodiment 2, an example in which the inclination is exaggerated (emphasized) and notified is described. Hereinafter, description of the same points as those of Embodiment 1 (for example, the same configuration and processing as those of Embodiment 1) is appropriately omitted.

FIGS. 8A to 8D illustrate an example of a screen displayed on the EVF 217 or the display unit 108. Straight lines 801 to 803 are displayed on a screen 800 in FIGS. 8A to 8D. The straight line 801 is an item (reference line) parallel to the horizontal direction of the live view image (the horizontal direction of the image sensor and the left-to-right direction of the camera 100). The straight line 802 is a line indicating the inclination (direction and magnitude of inclination) of the camera 100 with respect to the ground. The straight line 803 is a line indicating the inclination (direction and magnitude of the inclination) of the dual-lens unit with respect to the ground.

FIG. 8A illustrates an ideal state in which neither the camera 100 nor the dual-lens unit is inclined, with respect to the ground. The straight lines 802 and 803 are parallel to the straight line 801. By viewing these straight lines 802 and 803, the user can easily grasp that neither the camera 100 nor the dual-lens unit is inclined, with respect to the ground.

FIG. 8B illustrates a state in which the dual-lens unit is not inclined, but the camera 100 is inclined, with respect to the ground. A broken line 804 indicates an actual inclination of the camera 100. Since the inclination of the broken line 804 is minute, the user cannot easily grasp whether the camera 100 is inclined even if an item such as the broken line 804 is displayed.

Therefore, in FIG. 8B, the straight line 802 is inclined more than the actual inclination of the camera 100. For example, the straight line 802 is displayed such that the inclination of the straight line 802 (the angle between the straight line 801 and the straight line 802) is N (N>1) times the inclination of the broken line 804 (the angle between the straight line 801 and the broken line 804). The magnification N may be a predetermined fixed value or may be a value designated by the user. The straight line 803 is parallel to the straight line 801, but the straight line 802 is inclined. By viewing these straight lines 802 and 803, the user can easily grasp that the dual-lens unit is not inclined but the camera 100 is inclined, with respect to the ground.

Furthermore, in FIG. 8B, the user is notified also that the inclination of the camera 100 (and the dual-lens unit) is exaggerated (emphasized) by the display of a message 806. The message 806 indicates that the inclination is displayed in an exaggerated manner.

FIG. 8C illustrates a state in which the camera 100 is not inclined, but the dual-lens unit is inclined, with respect to the ground. A broken line 807 indicates an actual inclination of the dual-lens unit. Since the inclination of the broken line 807 is minute, the user cannot easily grasp whether the camera 100 is inclined even if an item such as the broken line 807 is displayed.

Therefore, in FIG. 8C, the straight line 803 is inclined more than the actual inclination of the dual-lens unit. For example, the straight line 803 is displayed such that the inclination of the straight line 803 (the angle between the straight line 801 and the straight line 803) is M (M>1) times the inclination of the broken line 807 (the angle between the straight line 801 and the broken line 807). The magnification M may be a predetermined fixed value or may be a value designated by the user. The magnification M may be the same as or different from the magnification N. The straight line 802 is parallel to the straight line 801, but the straight line 803 is inclined. By viewing these straight lines 802 and 803, the user can easily grasp that the camera 100 is not inclined, but the dual-lens unit is inclined, with respect to the ground.

Furthermore, in FIG. 8C, the user is notified also that the inclination of the dual-lens unit (and the camera 100) is exaggerated (emphasized) by the display of the message 806. As described above, the message 806 indicates that the inclination is displayed in an exaggerated manner.

FIG. 8D illustrates a state in which both the camera 100 and the dual-lens unit are inclined with respect to the ground. The straight line 802 with an exaggerated inclination is displayed similarly to FIG. 8B, and the straight line 803 with an exaggerated inclination is displayed similarly to FIG. 8C. Both the straight line 802 and the straight line 803 are inclined with respect to straight line 801. By viewing these straight lines 802 and 803, the user can easily grasp that both the camera 100 and the dual-lens unit are inclined, with respect to the ground. Further, the message 806 is displayed similarly to FIGS. 8B and 8C. The user is notified also that the inclination of the camera 100 and the dual-lens unit is exaggerated (emphasized) by the display of the message 806. As described above, the message 806 indicates that the inclination is displayed in an exaggerated manner.

As described above, according to Embodiment 2, the inclination of the camera and the inclination of the lens unit are notified in an exaggerated manner. In this way, even if the inclination of the camera is minute, the user can easily grasp whether the camera is inclined. Even if the inclination of the lens unit is minute, the user can easily grasp whether the lens unit is inclined.

Note that the system control unit 50 may display a screen as illustrated in FIGS. 8E to 8I.

A straight lines 810 is displayed on a screen 800 in FIGS. 8E and 8F. The straight line 810 is an item indicating an allowable range of the inclination of the camera 100. The inclination of the straight line 810 is a limit value of an allowable range of the inclination of the camera 100. The inclination of the straight line 810 is also an exaggerated inclination. By viewing the straight line 802 and the straight line 810, the user can easily grasp whether the inclination of the camera 100 is within the allowable range. In FIG. 8E, since the inclination of the straight line 802 is larger than the inclination of the straight line 810, the user can easily grasp that the inclination of the camera 100 is out of the allowable range. In FIG. 8F, since the inclination of the straight line 802 is smaller than the inclination of the straight line 810, the user can easily grasp that the inclination of the camera 100 is within the allowable range.

A straight line 811 is displayed on the screen 800 of FIGS. 8G and 8H. The straight line 811 is an item indicating an allowable range of the inclination of the dual-lens unit. The inclination of the straight line 811 is a limit value of the allowable range of the inclination of the dual-lens unit. The inclination of the straight line 811 is also an exaggerated inclination. By viewing the straight line 803 and the straight line 811, the user can easily grasp whether the inclination of the dual-lens unit is within the allowable range. In FIG. 8G, since the inclination of the straight line 803 is larger than the inclination of the straight line 811, the user can easily grasp that the inclination of the dual-lens unit is out of the allowable range. In FIG. 8H, since the inclination of the straight line 803 is smaller than the inclination of the straight line 811, the user can easily grasp that the inclination of the dual-lens unit is within the allowable range.

Both the straight line 810 and the straight line 811 are displayed on the screen 800 in FIG. 8I. Since both the straight line 810 and the straight line 811 are displayed, the user can easily grasp both whether the inclination of the camera 100 is within the allowable range and whether the inclination of the dual-lens unit is within the allowable range. Note that the straight line 810 may not be displayed when the inclination of the camera 100 is within the allowable range and may be displayed when the inclination of the camera 100 is not within the allowable range. The straight line 810 is not displayed when the camera 100 is not inclined and may be displayed when the camera 100 is inclined. Similarly, the straight line 811 may not be displayed when the inclination of the dual-lens unit is within the allowable range and may be displayed when the inclination of the dual-lens unit is not within the allowable range. The straight line 811 is not displayed when the dual-lens unit is not inclined and may be displayed when the dual-lens unit is inclined. The allowable range of the inclination of the camera 100 and the allowable range of the inclination of the dual-lens unit may be the same or different.

Note that, as the limit value of the allowable range of the inclination, there are two limit values of a limit value (maximum value) of the allowable leftward inclination and a limit value (maximum value) of the allowable rightward inclination. As an item indicating the allowable range, two straight lines corresponding to the two limit values may be displayed. However, in order to simplify the screen, as an item indicating the allowable range, only the straight line corresponding to the limit value corresponding to the current inclination direction may be displayed. In FIGS. 8E, 8F, and 8I, since the camera 100 is inclined to the left, only the straight line 810 corresponding to the limit value of allowable leftward inclination is displayed as an item indicating the allowable range of inclination of the camera 100. Similarly, in FIGS. 8E and 8F, since the dual-lens unit is inclined to the left, only the straight line 811 corresponding to the limit value of allowable leftward inclination is displayed.

Furthermore, the system control unit 50 may determine whether the inclination of the camera 100 is within an allowable range based on the camera inclination information. Then, the system control unit 50 may notify whether the inclination of the camera 100 is within the allowable range by making a mode (for example, color, brightness, or line type) of the straight line 802 different between a case where the inclination of the camera 100 is within the allowable range and a case where the inclination is not within the allowable range. Similarly, the system control unit 50 may determine whether the inclination of the dual-lens unit is within an allowable range based on the lens inclination information. Then, the system control unit 50 may notify whether the inclination of the dual-lens unit is within the allowable range by making a mode of the straight line 803 different between a case where the inclination of the dual-lens unit is within the allowable range and a case where the inclination is not within the allowable range. Similarly to the method of notifying the inclination, the method of notifying the allowable range and the method of notifying whether the inclination is within the allowable range are not particularly limited. When notifying whether the inclination is within the allowable range, the allowable range itself may not be notified. The determination as to whether the inclination of the dual-lens unit is within the allowable range may be performed by the dual-lens unit, and the system control unit 50 may acquire the determination result from the dual-lens unit.

In addition, the system control unit 50 may make the mode of the straight lines 802 and 803 different between a case where a condition that the inclination of the camera 100 is within the allowable range and the inclination of the dual-lens unit is within the allowable range is satisfied and a case where the condition is not satisfied. The system control unit 50 may make the mode of the straight lines 802 and 803 different between a case where the condition that neither the camera 100 nor the dual-lens unit is inclined is satisfied and a case where the condition is not satisfied. As a result, the user can easily grasp that both the inclination of the camera 100 and the inclination of the dual-lens unit are within the allowable range, and that both the camera 100 and the dual-lens unit are not inclined.

The various kinds of control described to be performed by the system control unit 50 may be performed by a piece of hardware, or processing may be shared among a plurality of pieces of hardware (for example, a plurality of processors or circuits) to control the entire apparatus.

Although the embodiments of the present invention are described in detail, the present invention is not limited by these specific embodiments, and various forms in the range without departing from the gist of the invention shall also be encompassed by the present invention. Each of the above-described embodiments merely illustrates an embodiment of the present invention, and the embodiments can be combined as necessary.

Furthermore, in the above-described embodiment, a case where the present invention is applied to a digital camera is described as an example, but the present invention is not limited to this example and can be applied to any imaging apparatus as long as a lens is attachable to and detachable from the imaging apparatus. For example, the present invention is applicable to a personal computer, a PDA, a mobile-phone terminal, a portable image viewer, a printer apparatus, a digital photo frame, a music player, a video game machine, and an electronic book reader. The present invention is further applicable to, for example, a video player, a display device (including a projector), a tablet terminal, a smart-phone, an AI speaker, a home electrical appliance, and an on-vehicle apparatus.

According to the present invention, it is possible to easily and sufficiently reduce an unintended positional deviation of the subject in the captured image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-087581, filed on May 29, 2023, which is hereby incorporated by reference herein in its entirety.

What is claimed is:

1. An imaging apparatus comprising:
a processor; and
a memory storing a program which, when executed by the processor, causes the imaging apparatus to
acquire information on an inclination of the imaging apparatus,
acquire information on an inclination of a dual lens in a case where the dual lens is mounted to the imaging apparatus,
perform first control so as to notify the inclination of the imaging apparatus based on the information on the inclination of the imaging apparatus, and
perform second control so as to notify the inclination of the dual lens based on the information on the inclination of the dual lens, wherein
control is performed so as to notify whether the inclination of the imaging apparatus is within a first allowable range and whether the inclination of the dual lens is within a second allowable range,
whether the inclination of the imaging apparatus is within the first allowable range is determined based on inclination information of the imaging apparatus, and information on whether the inclination of the dual lens is within the second allowable range is acquired from the dual lens.

2. The imaging apparatus according to claim 1, wherein the inclination of the imaging apparatus is an inclination of the imaging apparatus with respect to a horizontal plane, and the inclination of the dual lens is an inclination of the dual lens with respect to the horizontal plane.

3. The imaging apparatus according to claim 1, wherein the dual lens is a dual circular fish-eye lens.

4. The imaging apparatus according to claim 1, further comprising:

an orientation detection sensor, wherein the information on the inclination of the imaging apparatus is acquired from the orientation detection sensor.

5. The imaging apparatus according to claim 1, wherein the information on the inclination of the dual lens is acquired from the dual lens.

6. The imaging apparatus according to claim 1, wherein the inclination of the imaging apparatus and the inclination of the dual lens are notified in an exaggerated manner.

7. The imaging apparatus according to claim 6, wherein the first control is performed so as to display a first item inclined at an inclination larger than the inclination of the imaging apparatus, and the second control is performed so as to display a second item inclined at an inclination larger than the inclination of the dual lens.

8. The imaging apparatus according to claim 6, wherein control is performed so as to notify that the inclination of the imaging apparatus and the inclination of the dual lens are exaggerated.

9. The imaging apparatus according to claim 1, wherein the first control is performed so as to display a first item as a notification of the inclination of the imaging apparatus, the second control is performed so as to display a second item as a notification of the inclination of the dual lens, a mode of the first item is different between a case where the inclination of the imaging apparatus is within the first allowable range and a case where the inclination of the imaging apparatus is not within the first allowable range, and a mode of the second item is different between a case where the inclination of the dual lens is within the second allowable range and a case where the inclination of the dual lens is not within the second allowable range.

10. The imaging apparatus according to claim 1, wherein the first control is performed so as to display a first item as a notification of the inclination of the imaging apparatus, the second control is performed so as to display a second item as a notification of the inclination of the dual lens, and modes of the first item and the second item are different between a case where a condition that the inclination of the imaging apparatus is within the first allowable range and the inclination of the dual lens is within the second allowable range is satisfied and a case where the condition is not satisfied.

11. The imaging apparatus according to claim 1, wherein control is performed so as to notify a first allowable range that is an allowable range of the inclination of the imaging apparatus and a second allowable range that is an allowable range of the inclination of the dual lens.

12. The imaging apparatus according to claim 1, wherein the first control is performed so as to display a first item as a notification of the inclination of the imaging apparatus, the second control is performed so as to display a second item as a notification of the inclination of the dual lens, and modes of the first item and the second item are different between a case where a condition that the imaging apparatus and the dual lens are not inclined is satisfied and a case where the condition is not satisfied.

13. A control method of an imaging apparatus, comprising:

acquiring information on an inclination of the imaging apparatus, acquiring information on an inclination of a dual lens in a case where the dual lens is mounted to the imaging apparatus, performing first control so as to notify the inclination of the imaging apparatus based on the information on the inclination of the imaging apparatus, and performing second control so as to notify the inclination of the dual lens based on the information on the inclination of the dual lens, wherein control is performed so as to notify whether the inclination of the imaging apparatus is within a first allowable range and whether the inclination of the dual lens is within a second allowable range, whether the inclination of the imaging apparatus is within the first allowable range is determined based on inclination information of the imaging apparatus, and information on whether the inclination of the dual lens is within the second allowable range is acquired from the dual lens.

14. A non-transitory computer readable medium that stores a program, wherein the program causes a computer to execute a control method of an imaging apparatus, the control method comprising:

acquiring information on an inclination of the imaging apparatus, acquiring information on an inclination of a dual lens in a case where the dual lens is mounted to the imaging apparatus, performing first control so as to notify the inclination of the imaging apparatus based on the information on the inclination of the imaging apparatus, and performing second control so as to notify the inclination of the dual lens based on the information on the inclination of the dual lens, wherein control is performed so as to notify whether the inclination of the imaging apparatus is within a first allowable range and whether the inclination of the dual lens is within a second allowable range, whether the inclination of the imaging apparatus is within the first allowable range is determined based on inclination information of the imaging apparatus, and information on whether the inclination of the dual lens is within the second allowable range is acquired from the dual lens.

* * * * *